(12) United States Patent
Pesyna et al.

(10) Patent No.: US 9,845,768 B2
(45) Date of Patent: Dec. 19, 2017

(54) THREE STREAM, VARIABLE AREA, VECTORABLE NOZZLE

(71) Applicant: Rolls-Royce North American Technologies, Inc., Indianapolis, IN (US)

(72) Inventors: Kenneth M. Pesyna, Carmel, IN (US); Anthony F. Pierluissi, Indianapolis, IN (US); Bryan H. Lerg, Carmel, IN (US); Justin N. Moore, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 754 days.

(21) Appl. No.: 14/209,687

(22) Filed: Mar. 13, 2014

(65) Prior Publication Data

US 2015/0128561 A1    May 14, 2015

Related U.S. Application Data

(60) Provisional application No. 61/786,055, filed on Mar. 14, 2013, provisional application No. 61/780,807, (Continued)

(51) Int. Cl.
*F02K 3/077* (2006.01)
*F02K 1/12* (2006.01)
(Continued)

(52) U.S. Cl.
CPC .......... *F02K 1/1223* (2013.01); *F02K 1/1207* (2013.01); *F02K 1/1238* (2013.01); (Continued)

(58) Field of Classification Search
CPC ........ F02K 1/1223; F02K 1/123; F02K 1/822; F02K 1/825; F02K 3/105; F02K 3/115; (Continued)

(56) References Cited

U.S. PATENT DOCUMENTS 3,368,352 A * 2/1968 Hewson ................. F02K 3/025
    60/224
3,528,250 A * 9/1970 Johnson ................. F02C 7/185
    60/262

(Continued)

OTHER PUBLICATIONS

International Search report PCT/US2014/026880 dated Aug. 4, 2014.

*Primary Examiner* — William H Rodriguez
*Assistant Examiner* — Marc Amar
(74) *Attorney, Agent, or Firm* — Fishman Stewart PLLC

(57) ABSTRACT

An exhaust nozzle for a gas turbine engine may include a plurality of flap trains in the exhaust stream of the gas turbine engine. The flap trains are operable to selectively control three separate flow paths of gas that traverse the engine. A first stream of is the core airflow. The second stream of air is peeled off of the first stream to form a low pressure fan bypass air stream. The third stream of air traverses along the engine casing and is passed over a flap assembly to aid in cooling. The flaps are operable converge/diverge to control the multiple streams of air.

20 Claims, 4 Drawing Sheets

Related U.S. Application Data filed on Mar. 13, 2013, provisional application No. 61/780,772, filed on Mar. 13, 2013.

(51) Int. Cl.
  *F02K 1/15* (2006.01)
  *F02K 3/075* (2006.01)
  *F02K 3/115* (2006.01)
  *F02K 1/80* (2006.01)

(52) U.S. Cl.
  CPC ............. *F02K 1/15* (2013.01); *F02K 1/80* (2013.01); *F02K 3/075* (2013.01); *F02K 3/077* (2013.01); *F02K 3/115* (2013.01); F05D 2250/411 (2013.01); F05D 2260/50 (2013.01); F05D 2260/56 (2013.01); F05D 2270/051 (2013.01); F05D 2270/66 (2013.01); Y02T 50/671 (2013.01)

(58) Field of Classification Search
  CPC ... F02K 3/077; F02K 1/06; F02K 1/12; F02C 7/10; F02C 7/105; Y02T 50/675
  See application file for complete search history.

(56) References Cited

U.S. PATENT DOCUMENTS

| | | | | |
|---|---|---|---|---|
| 3,842,597 | A * | 10/1974 | Ehrich | F02C 7/141 60/226.1 |
| 3,938,328 | A * | 2/1976 | Klees | F02K 3/04 60/224 |
| 4,064,692 | A * | 12/1977 | Johnson | F02K 3/075 60/262 |
| 4,151,710 | A * | 5/1979 | Griffin | F02C 7/14 184/6.11 |
| 4,187,675 | A * | 2/1980 | Wakeman | F02C 7/185 165/163 |
| 4,245,787 | A * | 1/1981 | Freid | F02K 1/1269 239/265.41 |
| 4,254,618 | A * | 3/1981 | Elovic | F02C 7/185 60/226.1 |
| 5,335,489 | A | 8/1994 | Thayer | |
| 5,351,888 | A | 10/1994 | Taylor et al. | |
| 5,404,713 | A * | 4/1995 | Johnson | F02K 1/825 60/204 |
| 5,452,573 | A * | 9/1995 | Glickstein | F02C 6/08 60/39.183 |
| 5,484,105 | A | 1/1996 | Ausdenmoore et al. | |
| 5,706,650 | A | 1/1998 | Thayer | |
| 6,779,336 | B2 | 8/2004 | Allore et al. | |
| 6,983,602 | B2 | 1/2006 | Senile | |
| 7,032,835 | B2 | 4/2006 | Murphy et al. | |
| 7,624,579 | B2 | 12/2009 | Peters | |
| 7,757,477 | B2 | 7/2010 | Kehret et al. | |
| 8,205,454 | B2 | 6/2012 | Cowan et al. | |
| 2005/0161527 | A1 | 7/2005 | Murphy et al. | |
| 2005/0210864 | A1 | 9/2005 | Lapergue et al. | |
| 2005/0252193 | A1 * | 11/2005 | Iya | F02K 1/822 60/204 |
| 2007/0000232 | A1 | 1/2007 | Powell et al. | |
| 2008/0141655 | A1 * | 6/2008 | Johnson | F02K 1/82 60/226.3 |
| 2011/0115227 | A1 * | 5/2011 | Shafer | F01D 15/10 290/52 |
| 2011/0120082 | A1 * | 5/2011 | Giffin | F01D 5/022 60/226.3 |
| 2011/0120083 | A1 * | 5/2011 | Giffin | F01D 5/022 60/226.3 |
| 2011/0167792 | A1 * | 7/2011 | Johnson | F01D 17/162 60/226.3 |
| 2012/0128467 | A1 * | 5/2012 | Ruthemeyer | F01D 5/146 415/115 |
| 2012/0144843 | A1 * | 6/2012 | Donovan | F01D 25/12 60/806 |
| 2014/0345254 | A1 * | 11/2014 | Dawson | F02K 3/077 60/226.3 |

* cited by examiner

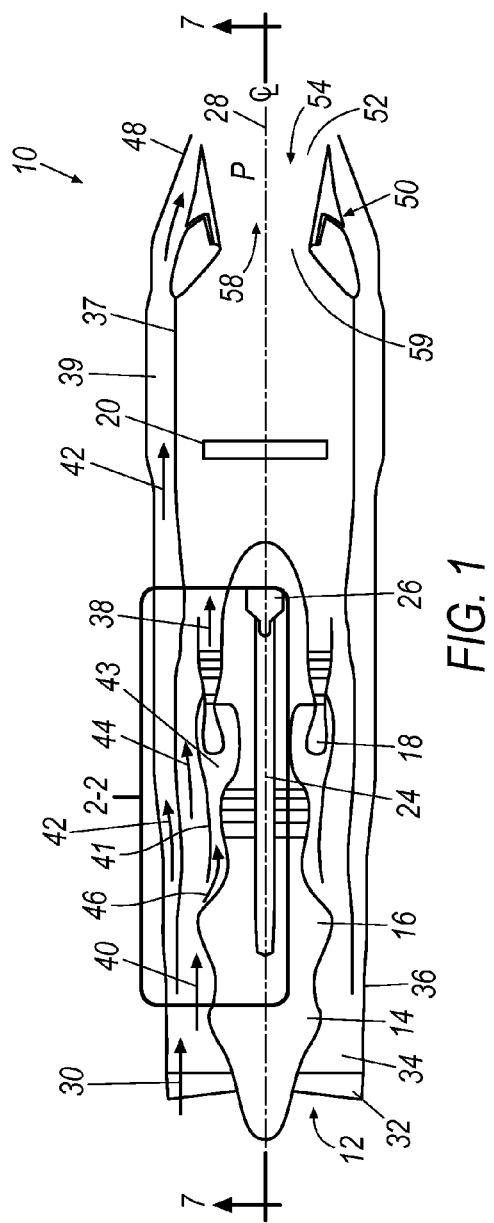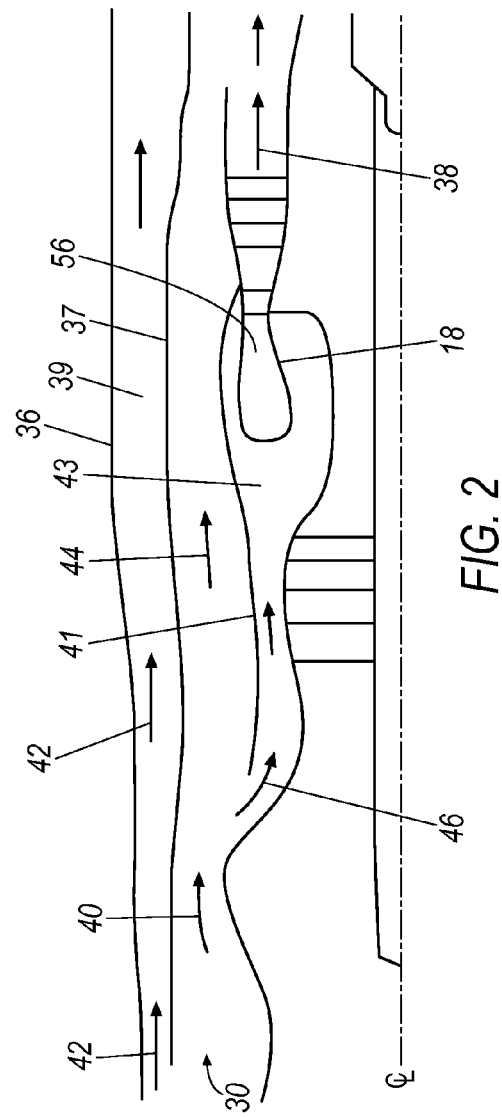

THREE STREAM, VARIABLE AREA, VECTORABLE NOZZLE

CROSS-REFERENCE TO RELATED APPLICATIONS

This application claims priority to U.S. Provisional Patent Application No. 61/780,772, filed Mar. 13, 2013, and U.S. Provisional Patent Application No. 61/786,055, filed Mar. 14, 2013, now U.S. patent application Ser. No. 14/209,749, titled "COMPACT ACTUATION SYSTEM FOR FLOW NOZZLE," and U.S. Provisional Patent Application No. 61/780,807, filed Mar. 13, 2013, now U.S. patent application Ser. No. 14/209,806, titled "THREE STREAM, VARIABLE AREA FIXED APERTURE NOZZLE WITH PNEUMATIC ACTUATION, the contents of which are all hereby incorporated in their entirety.

FIELD OF TECHNOLOGY

An improved nozzle assembly for a gas turbine engine is presented, and more particularly, an improved gas turbine engine vectoring exhaust nozzle having multiple streams of airflow.

BACKGROUND

Gas turbine machines operate under extremely high temperature ranges and cooling air is frequently used to cool the constituent components of the machine. This becomes particularly important when tactical aircraft must avoid being detected by guided missiles and anti-aircraft artillery. Under heightened and even normal operating conditions, gas turbine exhaust nozzles produce infrared radiation which is not desirable because the enemy can detect such signals and launch an attack using the heat signals that are being generated by the gas turbine engine.

In turbine machines that produce high fan pressure ratios the cooling air is highly compressed which results in elevated temperatures in the exhaust nozzle. This results in insufficient cooling by virtue of the increased air temperature. Bypass air may be directed to the turbine nozzle where substantial pressure is available to direct and modulate cooling flow.

Gas turbine exhaust nozzles can be vectored through a series of mechanisms, called flaps, so as to enhance cooling and performance of the turbine machine. In high performance, thrust augmented engines, there is a high area ratio between the outlet and throat area. Thus, since each engine is usually used in very large, multi-engine aircraft, it is highly desirable that the engines and their exhaust nozzles be clusterable so as to produce minimum base drag.

Exhaust nozzles may have an exterior shell casing of generally circular cross-section and include a number of circumferentially positioned and overlapping flaps which are actuatable between minimum and maximum positions. However, such constructs employ overlapping flap designs that present several limitations in achievable area ratios for the nozzle. Such nozzle configurations have to cope with the varying external geometry, which can be a problem in view of engine clustering and aircraft tail geometry, which may increase base drag due to necessary spacing.

It would be helpful to provide an improved gas turbine vectorable nozzle that improves the performance of the aircraft while employing actuatable flaps to accomplish preferred exit area of variability.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

FIG. 1 illustrates a schematic view of a gas turbine engine employing the improvements discussed herein;

FIG. 2 illustrates an enlarged view taken from circle 2-2 of FIG. 1, depicting a side view of an improved gas turbine engine having three streams of air;

DETAILED DESCRIPTION

Figure 3:
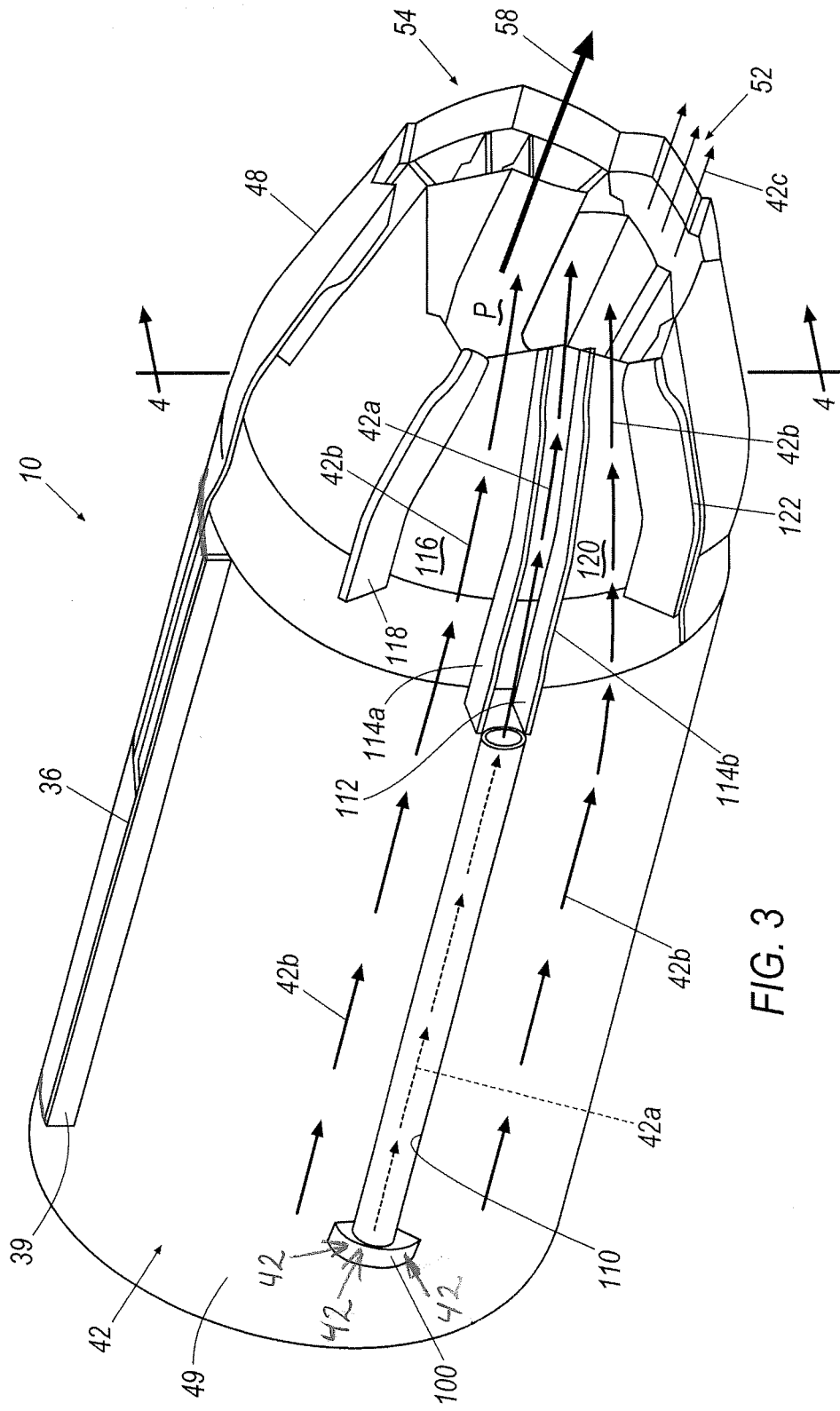
FIG. 3 illustrates a perspective view of a three stream air flow pattern relative to the nozzle of a gas turbine engine.

An exemplary embodiment of an exhaust nozzle assembly may include a three-stream variable flow area, having a fixed exit aperture nozzle with pneumatic operation and integration within a high performance gas turbine engine. The nozzle may utilize a combination of flow streams from the gas turbine engine to accommodate various flight operating conditions while maintaining a fixed exit aperture. It will be appreciated that the variable nozzle assembly may be operated by other non-pneumatic systems and integrated in other suitable applications. A heat exchanger may be located in the third air stream to provide a source to unload excess heat from the gas turbine as well as to provide conditioned air flow across a flap train that is located within the nozzle assembly.

The nozzle assembly may generally include a plurality of flap trains extending around a periphery of the gas turbine engine. Each flap train may include a convergent flap pivotally attached to an engine and a divergent flap pivotally attached the engine body downstream of the convergent flap.

A method of operating a nozzle assembly for use in connection with a gas turbine engine may include a pneumatic circuit operably coupled to a convergent and divergent flap system, pivoting those flaps radially inwardly and outwardly, while scheduling air flows through the circuit to a fixed cone located at the exit of the turbine. The circuit includes a core first stream, a low pressure second stream fan air, and high pressure third stream airflow. The low pressure fan air may be pushed over the first stream core air prior to entering the turbine while the third stream is forced over the variable flaps which may result in a cooling effect.

FIG. 1 illustrates a gas turbine engine 10, which includes a fan 12, a low pressure compressor and a high pressure compressor, 14 and 16, a combustor 18, and a turbine 20. The compressors 14, 16 are connected to a first rotor shaft 24 and a second rotor shaft 26, respectively. The shafts extend axially and are parallel to the longitudinal center line axis 28 of the machine 10.

Ambient air 30 enters the fan 12 and is directed across a fan rotor 32 in an annular duct 34, which in part is circumscribed by fan case 36 that extend substantially the axial length of the machine 10. Adjacent and offset from the fan case 36 is an axially extending wall 37 that defines a duct or chamber 39 for segregated airflow. Another axially extending wall structure 41 is offset from the wall 37 for defining another chamber 43 of segregated airflow.

A plurality of airflows traverse the engine 10 fore to aft including a first stream 38, a second stream 40, and a third stream 42. The second stream 40 is separated by the wall structure 41 into a low pressure fan bypass air stream 44 and a core inlet air stream 46. The core airstream traverses chamber 43 and enters the combustor 18 where it exits as a first stream 38. The streams of air exit a fixed nozzle 48 and are influenced by a plurality of flap trains 50. The flap trains 50 are positioned about the centerline axis 28 and further direct airflow from the air streams to the exit 52 of the nozzle 48.

Figure 4:
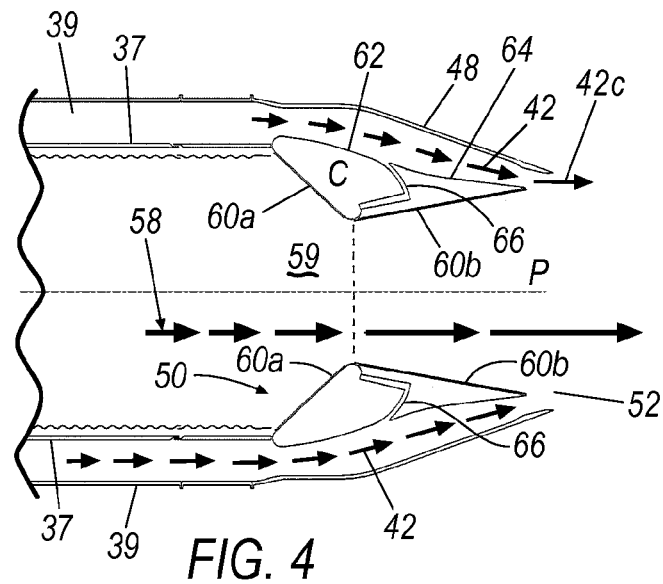
FIG. 4 illustrates an enlarged side-sectional view, taken from the perspective of line 4-4 of FIG. 3, showing a gas turbine nozzle having convergent and divergent flaps, during a SFC mode where a third airstream is flowing.
Figure 5:
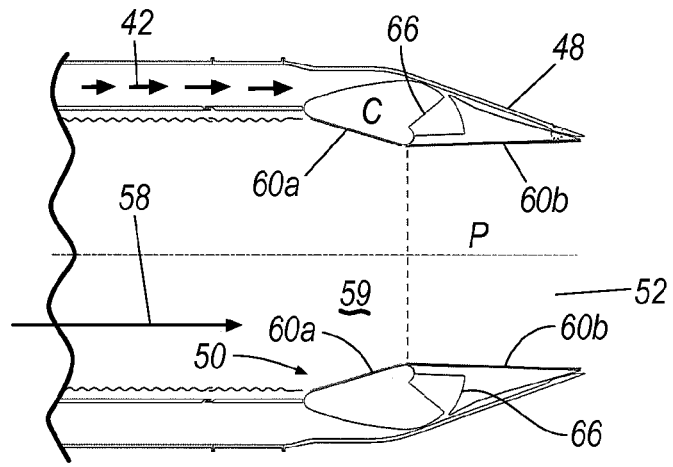
FIG. 5 is an enlarged side-sectional view, of the FIG. 4 embodiment, showing a nozzle configuration having convergent/divergent flaps, where the third stream is closed.
Figure 6:
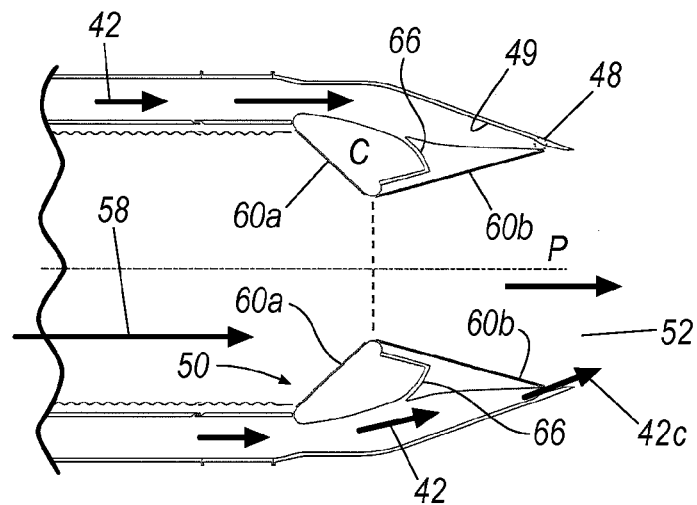
FIG. 6 illustrates a cross-sectional view of the FIG. 4 embodiment, showing a nozzle configuration having convergent/divergent flaps, during a military power mode where the third airstream air is employed.

Bypass airflow 30 provides engine thrust while the core inlet air stream 46 is directed to the combustor 18 and the turbine 20. The airflow traversing from the first stream 38, second stream 40 and third stream 42 are influenced by the working flap trains 50 as the air exits 52 of the nozzle 48. This is accomplished by the flap trains 50 articulating and working in concert as the pilot controls the aircraft and maneuvers between a plethora of modes, such as a specific fuel consumption (SFC) mode, a Max mode and a military power mode. FIGS. 4-6 illustrate examples of such modes. The gas turbine engine 10 includes an improved three stream variable area variable nozzle assembly 54 which includes the fixed nozzle 48 and the flap trains 50.

FIG. 2 illustrates an enlarged view taken from circle 2-2 of FIG. 1 showing the air flow streams in the machine 10 during operation. The third stream fan air 42 traverses adjacent the fan case 36 carrying ambient cool air through chamber 39 from the front of the machine 10 towards the exit 52 of the nozzle 48. This by-passed cooled air 42 enhances engine thrust and fuel efficiency and can be vectored by the flap trains 50 to where the chamber 39 may be closed or opened based on the pilots desired operating conditions. One or more heat exchangers 100 may be placed within the chamber 39 (see FIG. 7) at various locations in order to provide a source for unloading excess heat that accumulates in the engine 10 and/or the aircraft associated therewith.

The second stream 40 of air receives its supply from the ambient air 30 flow that flows off of the fan 32. The second stream 40 traverses in a substantially axial flow direction but is interrupted by the wall or diverter 41 whereby the air stream is diverted into the low pressure fan by-pass air stream 44 and the core inlet airstream 46. The low pressure by-pass air 44 is not compressed by the compressors 14, 16 nor is it heated by combustor 18. Instead it is low pressured cooled air that is later mixed with the combusted air referred to as the first airstream 38. The first airstream 38 and by-pass air 44 combine to form a core exit airflow 58 which flows axially towards the exit 52 of the nozzle 48. The core inlet airflow 46 traverses axially to where it is compressed by compressors 14, 16 and is introduced into combustor 18. The combusted air 56 exits the combustor 18 which is the genesis of the first stream 38. The core exit airstream 58 has a throat area 59 which is in part defined by the inner diameter of the flap trains 50. It will be appreciated that a plurality of flap trains 50 may be circumferentially spaced about the engine 10.

FIG. 3 illustrates a partial perspective schematic view of the nozzle structure 48. It will be appreciated that a fixed nozzle 48 is depicted. However a variable nozzle having a positionable cone geometry may be employed. The nozzle 48 is shown with its out skin shown removed in one portion 49 so as to better illustrate the airflow streams that traverse the engine 10.

Figure 7:
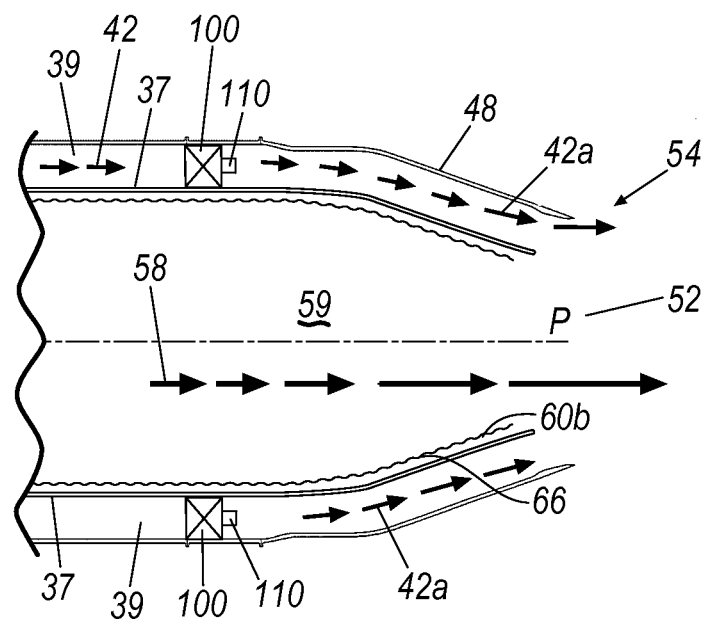
FIG. 7 illustrates an enlarged side-sectional view, taken from the perspective of line 7-7 of FIG. 1, showing a heat exchanger located in a duct for the third air stream.

With reference to FIGS. 3 and 7, multiple airflow paths are shown traversing the nozzle assembly 54 which handles the flow of the air streams as they exit 52 the nozzle cone 48. The third stream of air 42 is shown entering the nozzle but can divert and separate into multiple flow paths. For example, air enters duct 39 as bypass air 42 which in turn may be directed into a heat exchanger 100 that is associated with the duct 39. Conditioned air 42a exits the heat exchanger and traverses axially along a path towards the nozzle exit 52. Bypass air 42 may bypass the heat exchanger 100 and instead travel towards the nozzle along a path 42b. The variable airstream 42c may exit the flaps when the flap trains 50 are open and allow air to exit the conduit 39. Thus, the flap trains 50 operate to throttle airflow to generate a variable airstream 42c.

The heat exchanger 100 is in fluid communication with a heat exchanger duct 110. The duct 110 is fluidly connected to the heat exchanger 100 at one end, and is connected to a fluid channel 112 at another end. Channel 112 includes a pair of walls 114a and 114b that extend axially near the aft portion of the nozzle 48. The walls 114a and 114b define a space for conditioned air 42a to pass to the exit 52 of the nozzle. Another channel 116 is defined by a pair of spaced apart walls 114a and 118 that extend axially. Third stream air 42b passes along the channel 116 and is fed to the plenum P near the exit 52 of the nozzle 48. Moreover, another channel 120 is defined by a pair of spaced apart walls 114b and 122 that extend axially. The channel 120 provides another space for the third air stream 42b to provide air over the flaps 50 to the plenum P.

In an exemplary embodiment a pair of heat exchanger ducts 110 may be located, for example, at the 3 o'clock and 6 o'clock positions of the engine 10. Each duct 110 is positioned within the channel 39 and the duct 110 extends axially along the engine 10. The duct 110 is operable to carry conditioned air 42a within the duct 110 to the channel 112 and then on to the plenum P of the nozzle 48. The heat exchanger 100 has a cooling circuit and hardware for exchanging heat from a gas turbine source that needs to unload energy. It will be appreciated that the heat exchanger 100 could provide conditioned air to the flap train 50, nozzle assembly 54, or to other components, so as to reduce infrared heat signals.

With continued reference to FIG. 3, all combined streams may exit through a fixed exit area, i.e., cone 48, which may be circular, rectangular, elliptical or other suitable shapes. These shapes may improve control of the flow divergence through the flow path of the nozzle, while also decreasing the boat tail angle. This shape may depend on the flaps and other architecture chosen for the nozzle. The core stream 58 is shown exiting the nozzle 48 along the centerline axis 28 of the machine 10 while the third stream 42 is shown in solid lines exiting the chambers 39. The flap trains 50 articulate to varying geometric positions so as to schedule different air flows which in turn causes air to impinge on the outer cone nozzle 48.

The exemplary design that is shown in FIGS. 3 and 4, shows a concept in which 20 flaps (10 primary, 10 secondary) may be arranged in a cyclic symmetrical manner. Each flap train 50 may contain a primary convergent flap 60*a* and secondary divergent flap 60*b* pair and another convergent flap 62 and a divergent flap 64. Flaps 62, 64 impinge upon the third air stream 42. The flaps may be separated by a fixed area angular wedge 66 having an included angle between adjacent convergent/divergent flap hinge lines. The third airstream 42 may demand streams or flows out of the fixed area wedges 66 which may result in filling the base area and providing the corresponding performance benefit.

FIG. 4 shows the basic arrangement of the nozzle geometry having a minimum primary throat area 59, while having a maximum third stream area 42. This configuration represents a cruise (SFC) mode. The primary flaps 60*a* may be closed to define a desired primary nozzle throat area 59, while the secondary flaps 60*b* may open the variable third stream 42 flow passage from chamber 39, thus allowing by-pass air to exit the nozzle 48 with a controlled throttled stream 42*c* of airflow. The FIG. 5 shows the arrangement of the flap trains 50 having geometry in the maximum primary throat area 59, during a minimum third stream area mode. FIG. 6 shows the arrangement of the flap train 50 having geometry in the minimum primary throat area 59, during a maximum third stream area military mode. In this configuration, the converging flap 60*b* advances towards inner surface 49 of the cone 48 to cause a throttled stream 42*c* of airflow. This throttled stream 42*c* of airflow is also shown (in FIG. 3) exiting the nozzle assembly 52.

FIG. 7 illustrates an enlarged side-sectional view taken from line 7-7 of FIG. 1. This represents a section cut taken at the 3 o'clock and 9 o'clock positions of the engine 10. In this position, a heat exchanger 100 is positioned in association with the channel 39 that hosts the third airstream 42. Downstream from the heat exchanger 100 is a heat exchanger duct 110 that is positioned within the channel 39. The duct 110 provides a conduit for transferring conditioned fluid, such as air 42*a*, to the aft portion of the nozzle. In addition, the duct 110 may be fluidly connected to the channel 112. Collectively the channel 112 and the duct 110 carry conditioned air towards the exit of the nozzle. The conditioned air 42*a* may also be used to cool components of the nozzle assembly 54.

As shown in FIGS. 1-6, the construct of the nozzle 48 may define a series of passages for multiple streams. For example, these streams may include a primary stream (mixed core and bypass flows) 38, a variable area third stream 42, a fixed area second stream 44 which bypasses a heat exchanger, and a variable area stream 58 that exits the throat area 59. The third stream 42 may be segregated into streams 42*a*, 42*b* and 42*c* (see FIG. 3). In this respect, the nozzle 48 may exhaust multiple streams of air. The stream 42*a* is a continuous flow of conditioned air the flows from the heat exchanger 100. The stream 42*b* is a constant flow of air the bypasses the heat exchanger 100 and flows directly over the flaps 50 to the exit of the nozzle. The stream 42*c* exits from a variable area valving arrangement that is defined by the flaps 60*b* that engage the cone 48. Thus stream 42*c* is a variable stream of air. The fixed area streams exit fixed area slots between the variable area flaps 50.

Each of the convergent 60*a* and divergent flaps 60*b* may include one or more chambers C for receiving air from a pneumatic circuit so as to pivot the respective flaps radially inward or radially outward. Each flap 60*a* and 60*b* may further include one or more seals (not shown), gaskets, O-rings or other suitable sealing mechanisms adjacent to the respective chambers C to prevent the working fluid from leaking out of those chambers. The working fluid may be compressor bled air. By receiving the working fluid and changing the area of the streams, the flaps 60*a* and 60*b* may act as both flow surfaces and moveable pistons.

In particular, pivoting the flaps 60*a* and 60*b* using regulated compressor bleed air may provide the ability to vary the throat and internal exit areas of the primary and third stream nozzles. The actuated flaps 60*a* and 60*b* may be segregated from each other by, for example, pivotally attaching the convergent or primary flaps 60*a* to one location in the nozzle 48 and divergent or secondary flaps 60*b* to another separate location in the nozzle 48. In particular, third stream 42 flow may flow over the primary flaps 60*a* that set the area for the primary or core stream 58, and the throat 59 for the primary flow area may be dictated by secondary flaps 60*b* that are hinged further downstream of the nozzle 48.

The primary flaps 60*a* may be used to size the minimum area (throat) 59 of the primary stream 58. The secondary flaps 60*b* may control the area of the exit of the third stream 42. At max power takeoff conditions or afterburning conditions, the secondary flaps 60*b* can be pivoted radially outward to substantially block the third stream 42 (as shown in FIG. 5) to increase the jet thrust through the primary core stream 58. The shaping of the flap trains 50 may increase the overall performance of the combined flows.

The nozzle's fixed exit area 52 may be sized based on a diffusion factor from the maximum area of the throat 59 (i.e. max power afterburning conditions). Therefore, the exit area 52 may result in overexpansion of the nozzle 48 in most other operating conditions. However, the third stream 42 may act like a supersonic ejector at these conditions, filing the plenum P and minimizing the overexpansion that the primary stream 58 would otherwise experience. The result may be higher performance across vastly different flight conditions while keeping a fixed exit area 52. The fixed exit 52 area may provide a clean external surface and therefore decrease drag.

The variable throat 59 area of the nozzle assembly 54 may be capable of high performance at very different flight conditions by actuating the internal nozzle geometry by the use of the flap trains 50. Furthermore, the nozzle assembly 54 may use the engine third stream 42 flow as a supersonic ejector at conditions where the nozzle 48 would otherwise be over expanded to minimize nozzle losses. This may alleviate the trade between cruise and after burning performance that would otherwise be expected for a fixed exit area nozzle.

A method of transferring air through a gas turbine engine will now be presented. It will be appreciated that other methods may be employed. Initially, a first duct, a second duct, and a third duct traversing substantially axially relative to the centerline axis of the machine 10 can be provided. The machine 10 further may include providing a fan to induce air into each of said ducts. Next the method includes providing a mechanical flap system, such as that shown in FIGS. 4-6. Next the fan, such as 32, is powered which in turn causes first, second and third streams of air to be pushed through a plurality of ducts such as first, a second and third ducts.

The next step of operation includes combusting the first stream of air to form a combusted stream 38 of air and then combining the combusted stream of air with the second stream 44 of air to form a core outlet air stream 58. The next step is separating the air in the third duct 39 into a conditioned air stream 42a and bypass air stream 42. The airstreams are then manipulated by a mechanical flap system 50 to control the flow of the core outlet air stream, the conditioned air stream, and the bypass air stream. It will be appreciated that a heat exchanger can be provided for generating conditioned air that forms the conditioned air stream.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A gas turbine engine having an exhaust nozzle, the engine comprising:
   a fan operable to direct intake air to an intake portion of the gas turbine engine, the intake air is separated into multiple streams of air throughout the engine and downstream from a low pressure compressor and a high pressure compressor of the gas turbine engine, the multiple streams of air include:
   a first stream of air that is directed to a core of the gas turbine engine;
   a second stream of air that is partitioned from the first stream of air, the second stream of air traverses a length of the engine, wherein the first and second streams of air rejoin prior to passing through a turbine of the gas turbine engine;
   a third stream of air that is separated from the second stream of air, the third stream of air traverses the length of the engine and is injectable to a plenum of a nozzle assembly; and
   the gas turbine engine further comprising the nozzle assembly that is selectively operable to control the flow of the first, second and third streams of air in order to accommodate varying flight operating demands, the nozzle assembly including a primary convergent flap and a secondary divergent flap that is attached to the primary convergent flap, the primary convergent flap pivotal inwardly and outwardly to define a throat area of the exhaust nozzle, and the secondary divergent flap pivotably attached to the primary convergent flap, the secondary divergent flap pivotable to control a flow rate of the third stream of air.

2. The gas turbine engine as claimed in claim 1, further comprising a heat exchanger located in fluid communication with the third stream of air during operation of the gas turbine engine.

3. The gas turbine engine as claimed in claim 1, further comprising a heat exchanger duct that is located within the third stream of air during operation of the gas turbine engine.

4. The gas turbine engine as claimed in claim 1, wherein the nozzle assembly includes at least one flap train, the flap train includes the primary convergent flap and the secondary divergent flap.

5. The gas turbine as claimed in claim 4, wherein the nozzle assembly includes a fixed cone that circumscribes a plurality of dynamic flap trains that include the at least one flap train.

6. The gas turbine engine as claimed in claim 1, wherein the primary convergent flap and the secondary divergent flaps are actuatable flaps that control a flow of air between the third stream of air and a core exit stream of air that is comprised of the first stream of air and the second stream of air.

7. The gas turbine engine as claimed in claim 6, wherein one of the actuable flaps is operable to engage an inner surface of a cone of the nozzle assembly, the one actuable flap positionable to an open position and to a closed position, wherein when the one actuable flap is positioned to the open position, the third stream of air flows into the plenum of the nozzle assembly, and when the one actuable flap is positioned to the closed position, the third stream of air is shut off.

8. The gas turbine engine as claimed in claim 1, wherein the nozzle assembly includes a flap system having the primary convergent and the secondary divergent flaps that may be controlled by an operator, the flap system configured to operate in one of a cruise mode, a maximum mode, or a military mode.

9. The gas turbine engine as claimed in claim 1, further comprising a plurality of channels that extend axially along a surface of the nozzle, each channel is operable to direct the third stream of air towards the plenum of the nozzle assembly.

10. The gas turbine engine as claimed in claim 1, further comprising a third airstream channel that extends axially and near an outer surface of the engine, the third airstream channel directs the third stream of air towards an exit of the nozzle.

11. The gas turbine engine as claimed in claim 10, further comprising a heat exchanger.

12. The gas turbine engine as claimed in claim 10, further comprising a conditioned air duct system for transferring conditioned air to the plenum of the nozzle assembly.

13. The gas turbine engine as claimed in claim 1, wherein the third stream includes a fan bypass air portion and a conditioned air portion, each said portion traverses an annular duct.

14. The gas turbine engine as claimed in claim 1, wherein the first and second streams of air combine rejoin downstream of a combustor of the gas turbine engine.

15. The gas turbine engine as claimed in claim 14, wherein the first stream of air passes into the combustor and the second stream of air bypasses the combustor.

16. An exhaust nozzle for an engine comprising:
   a fan that generates first, second, and third streams of air, wherein the first and second streams of air diverge downstream of at least one compressor of the engine;
   the first stream of air that exits a core of the engine;
   the second stream of air that traverses a length of the nozzle and is directed to a plenum of the nozzle, wherein the first and second streams of air combine rejoin downstream of a combustor of the engine and prior to passing through a turbine of the engine; and
   the third stream of air is separated from the second stream of air, the third stream of air traverses the length of the engine and is injectable to the plenum of the nozzle, the third stream of air includes fan bypass air and is conditioned by a heat exchanger, the exhaust nozzle including a primary convergent flap and a secondary divergent flap that is attached to the primary convergent flap, the primary convergent flap pivotal inwardly and outwardly to define a throat area of the exhaust nozzle, and the secondary divergent flap pivotably attached to the primary convergent flap, the secondary divergent flap pivotable to control a flow rate of the third stream of air.

17. The exhaust nozzle as claimed in claim 16, further comprising a nozzle assembly that is selectively operable to control the flow of the first, second and third streams of air in order to accommodate varying flight operating demands.

18. The exhaust nozzle as claimed in claim 16, further comprising a flap train system having both the primary convergent and secondary divergent flaps for controlling a flow of air through the nozzle.

19. A method of transferring air through a gas turbine engine comprising:
providing a first duct, a second duct, and a third duct;
providing a fan to induce air into each of said ducts;
providing a mechanical flap system of an exhaust nozzle;
motivating the fan to cause first, second and third streams of air to be pushed through said first, second and third ducts, respectively, wherein the first and second streams of air diverge downstream of at least one compressor of the engine, the first stream of air that exits a core of the engine, the second stream of air that traverses a length of the exhaust nozzle and is directed to a plenum of the exhaust nozzle, and the third stream of air is separated from the second stream of air, the third stream of air traverses the length of the engine and is injectable to the plenum of the nozzle;
combusting the first stream of air to form a combusted stream of air and then rejoining the combusted stream of air with the second stream of air to form a core outlet air stream prior to passing through a turbine of the engine;
separating the air in the third duct into an air stream conditioned by a heat exchanger and into a bypass air stream; and
manipulating the mechanical flap system to control the flow of the core outlet stream, the conditioned air stream, and the bypass air stream, the mechanical flap system of the exhaust nozzle including a primary convergent flap and a secondary divergent flap that is attached to the primary convergent flap, the primary convergent flap pivotal inwardly and outwardly to define a throat area of the exhaust nozzle, and the secondary divergent flap pivotably attached to the primary convergent flap, the secondary divergent flap pivotable to control a flow rate of the third stream of air.

20. The method as claimed in claim 19, further comprising the step of passing air through the heat exchanger, the heat exchanger is operable to generate conditioned air that forms the conditioned air stream.

* * * * *